March 8, 1938. O. B. WELKER 2,110,783
RESILIENT BUSHING AND METHOD AND APPARATUS FOR MAKING SAME
Filed April 25, 1936 2 Sheets-Sheet 1
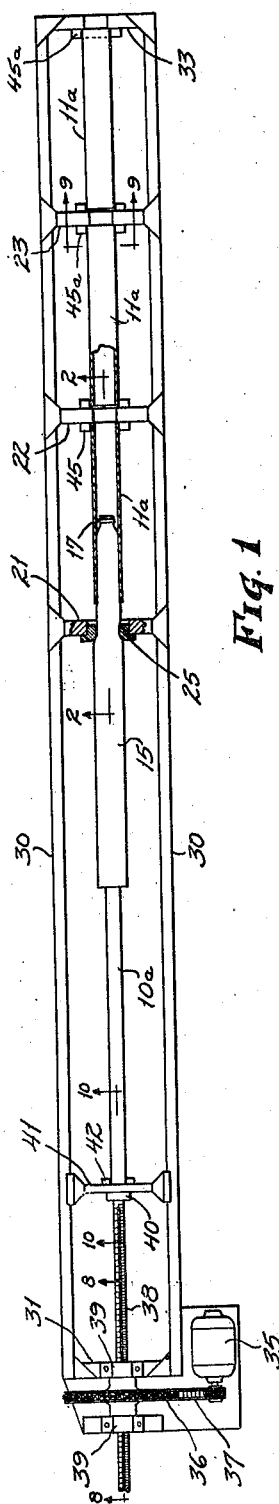
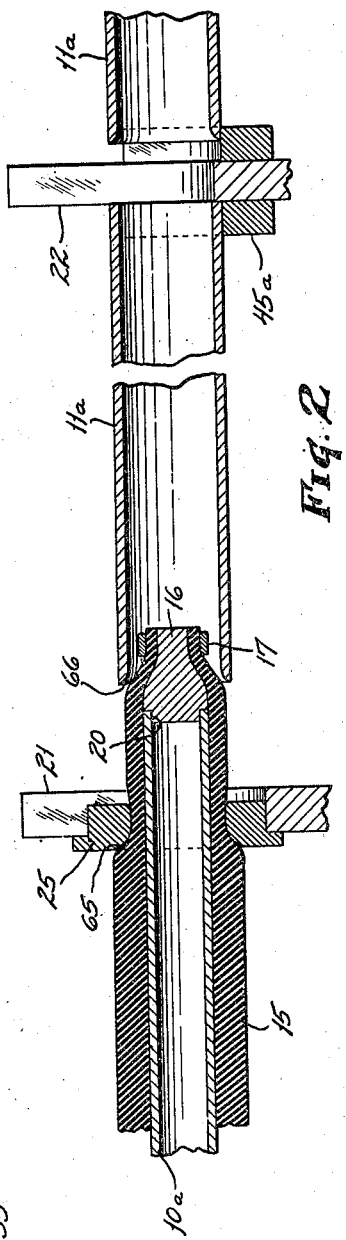
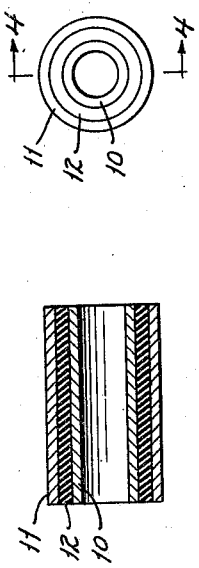
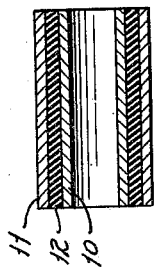
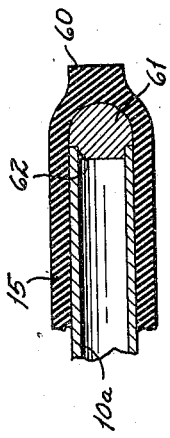
INVENTOR.
OSCAR B. WELKER
BY Bates, Goldrick, & Teare
ATTORNEYS March 8, 1938.  O. B. WELKER  2,110,783
RESILIENT BUSHING AND METHOD AND APPARATUS FOR MAKING SAME
Filed April 25, 1936  2 Sheets-Sheet 2
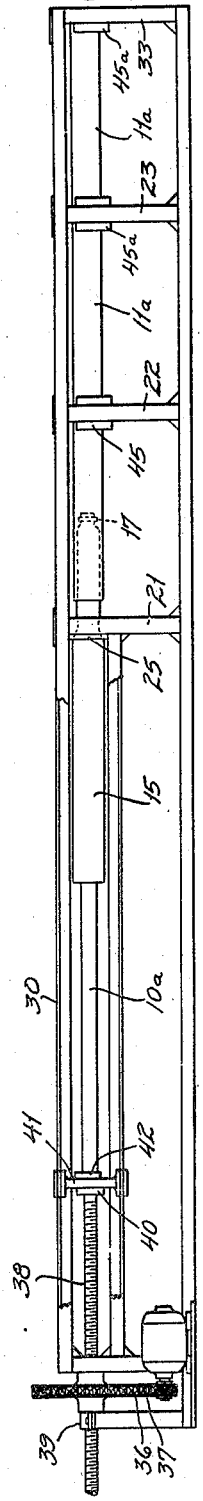
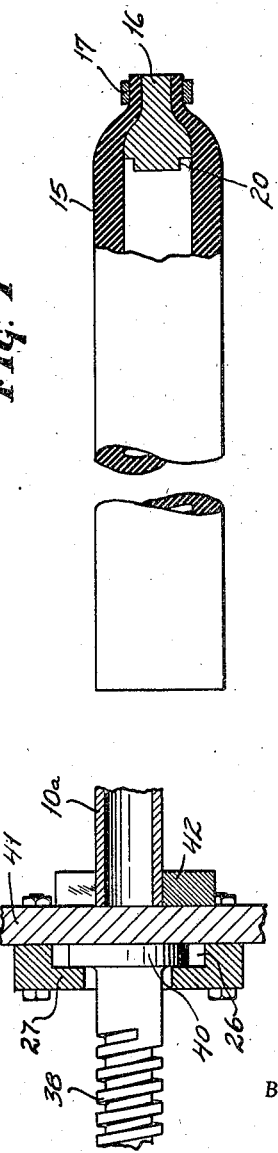
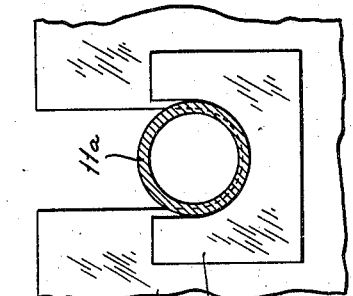
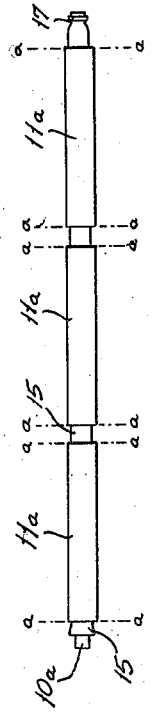
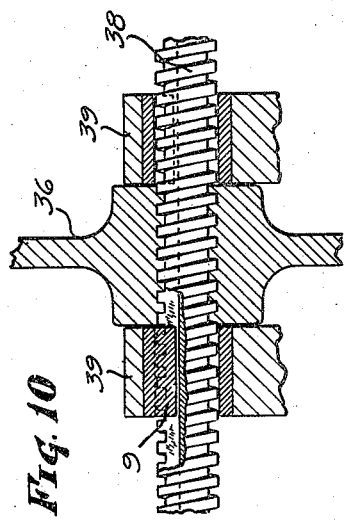
INVENTOR.
OSCAR B. WELKER
BY Bates, Golrick, & Teare
ATTORNEYS Patented Mar. 8, 1938

2,110,783

UNITED STATES PATENT OFFICE 2,110,783

RESILIENT BUSHING AND METHOD AND APPARATUS FOR MAKING SAME

Oscar B. Welker, Middletown, Conn., assignor to Albert R. Teare, Cleveland, Ohio, trustee Application April 25, 1936, Serial No. 76,392

5 Claims. (Cl. 29—83.2)

This invention relates to improvements in resilient connections, which embody inner and outer rigid members and an intermediate layer of rubber or other elastic material, and the invention includes an article having improved structural characteristics, which enhance the quality of the finished product, and which extend its availability for use.

Many forms of elastic connections, or bushings of the type referred to have been placed upon the market, but experience has shown that there are certain objections inherent in them. For example, in one form, the hollow rubber tube or sleeve has been assembled by first compressing it by inserting it into the outer tube and then further compressing it by the use of an expanded mandrel before the inner tube is inserted into place. The resulting bearing is thereby limited in length and the stresses are distributed unequally from one end to the other.

Another form of bearing has been made by curing the rubber between concentric tubes. The shrinkage of the rubber during the cooling operation is then depended upon to place it under tension. As a result, the rubber is unable to withstand very much repeated torsional movement under load. Moreover, the rubber, being under tension, deflects more than under compression, thereby allowing the inner tube to move more readily out of center under dead load.

In making a bearing of this type, it is important that the rubber be placed under a high degree of compression and that the stresses be distributed uniformly throughout the rubber, for uniform distribution results in greater frictional resistance and a longer life of the rubber. An effort to accomplish this result has included a method of manufacture in which the rubber sleeve has been slipped onto an inner tube for nearly its entire length and then compressed by pressing the outer tube into place. This method, however, did not place the rubber under a sufficient degree of compression to make a practical joint, and did not permit a bearing to be made in unlimited lengths. Moreover, it did not distribute the stresses uniformly.

Still another effort to obtain the desired degree of compression has been to mount the rubber sleeves in tandem between the inner and outer tubes, and then to draw them together axially by the use of bolts. Under this method of manufacture, the rubber is not uniformly compressed for the greatest stress is at the ends where the attaching force is applied.

A further effort to overcome the difficulties enumerated has included the curing of a mass of rubber to the inner member and then forcing the assembly endwise into an outer member. Under such practice however, the rubber can not flow on the bonded area and hence the flow takes place only in the unbonded area, and hence the stresses are unequally distributed. A further objection to the curing operation is the fact that it is too expensive to be practical and that the length of bushing produced is limited to very small sizes.

An object of my invention is to make a resilient bearing in which the intermediate layer of elastic material is so stretched at the time of its assembly between the inner and outer tubes, that the stresses are equally distributed throughout the length of the material. The invention also includes a method of manufacture by means of which resilient bearings may be made in any desired length thereby extending the field of usefulness of such bearings to an extent hitherto unknown. An additional object is to make the bearings in multiple, regardless of the shape of the outer member.

Referring now to the drawings, Fig. 1 is a top plan view of a machine for making the torsional bushings in accordance with my invention; Fig. 2 is a vertical section taken on the line 2—2 in Fig. 1 and shown on a scale larger than that of Fig. 1; Fig. 3 is an end view of the torsional bushing; Fig. 4 is a section taken on the line 4—4 in Fig. 3; Fig. 5 is a section showing a modified form of construction of the stock from which the elastic sleeves are made; Fig. 6 is a side elevation partly in section, of the rubber stock; Fig. 7 is a side elevation of the machine; Figs. 8, 9 and 10 are sections taken on the correspondingly numbered lines in Fig. 1; and Fig. 11 is a side elevation of an assembled unit before the sections have been cut therefrom.

In Figs. 3 and 4, the bushing, which is made in accordance with my invention, comprises an inner member 10, an outer member 11 and an intermediate member 12, all of which are shown as being cylindrical in shape and as having a common axis. The inner and outer members are preferably made of metal, while the intermediate member is made of elastic material, such as rubber. The present invention is not only concerned with the method of inserting the elastic sleeve in a place between the outer and inner members but is also intended to include the article that is made thereby, as well as the apparatus for producing it.

The preferred manner of carrying out my invention comprises the formation of rubber stock into a long tube, the body of which is indicated at 15. One end of the tube is closed and the opposite end is open. The closed end in one form of the invention may be formed by a plug 16, the outer end of which is reduced and is closely embraced by the stock. A ring 17 embraces the stock at the reduced neck and cooperates with the plug to impart strength to the stock at the closed end, so as to enable it to withstand the stresses that are incident to the stretching operation. The inner diameter of the stock is substantially equal to the outer diameter of the inner member 10, while the outer diameter of the stock is larger than the inner diameter of the member 11. Consequently it is necessary to reduce the wall thickness of the stock, and this I accomplish by stretching it during the assembly operation.

The method by which I insert the elastic bushing between the inner and outer members comprises the insertion of a long continuous tube 10a into the stock until the forward end of it engages an annular shoulder 20 at the inner end of the plug 16. The assembled unit is then placed in a machine and moved in an axial direction through a forming die 25, which partially reduces the diameter of the rubber sleeve from whence it is passed into the tube 11a, which further reduces it to the finished size. The tube 11a when removed from the machine becomes the outer member 11 of the finished bushing.

The machine, which I have shown for stretching the rubber during the inserting operation, may comprise an open frame which has sides 30, and ends 31 and 33 respectively. Between the ends there is a cross-member 21, which supports the die 25 and there are other cross members 22, and 23 each of which supports one end of a tube 11a. In the illustration shown the end member 33 functions likewise as a support for one of the tubes 11a. While I have illustrated the machine as supporting three tubes 11a in tandem relationship, it is to be understood that the machine is capable of use with any number of tubes and that it may be designed for tubes of any length.

To force the stock into the outer member, I have shown an electric motor 35 which is adapted to rotate a gear 36 as by a belt drive 37. The gear 36 has the bore thereof threaded for engagement with a threaded spindle 38, which may be splined to a key 9 in one of the bearing caps 39. The spindle may have one end thereof connected to a carriage 41 that is mounted for movement along the members 30. The connection is illustrated in detail in Fig. 10 wherein the end of the spindle has a flange 40 that fits loosely into an opening 26 in a plate 27 that is fastened to the carriage. The carriage is provided with a saddle 42 in which the rearward end of the tube 10a is adapted to be supported, the saddle being U-shaped so that the tube together with the assembled stock thereon may be quickly inserted within the machine. It is to be understood that the axis of the threaded spindle is coextensive with that of the tube and with those of the tubes 11a.

To use the apparatus, the tube 10a is inserted into the rubber stock until it engages the closed end thereof whereupon the projecting end of the tube is placed within the saddle 42. At such time the neck of the stock is disposed between the carriage 41 and the die 25. The motor is then started whereupon the operator guides the forward end of the stock into the die. He then places one end of a tube 11a into a U-shaped saddle 45 on the cross member 22 and manually guides the other end to receive the moving unit that has passed through the die. The position of the parts at such time is represented in Fig. 2. As soon as the stock has entered such tube, the operator is then free to place another tube in the saddle 45a on the cross-member 23 and guide it in the same manner to receive the forwardly moving stock. The same operation is repeated until all of the tubes for which the machine has been designed have been assembled. It is understood that the length of the inner tube and of the rubber stock is such that at the completion of the operation the reduced neck projects beyond the farmost end of the last outer tube. Thereupon, the unitary structure which comprises the tube 10a, the stretched rubber stock and the plurality of tubes 11a is lifted from the machine and the motor is reversed to return the carriage to its initial position. The assembled unit which is shown in Fig. 11 is then cut into sections as along the lines a—a, each having a length of the outer tube 11a so that the finished product corresponds to that shown in Fig. 4. If desired however the outer tube may comprise an elongated member from which sections may be cut transversely. In such case the tube supports 22 and 23 would be eliminated and the tube would be supported on the end 33.

A modification of the rubber stock is shown in Fig. 5, wherein the forward end thereof is closed solely by the rubber wall which is reinforced by a thickened portion 60 to resist the stresses that are imparted to it during the stretching operation. To facilitate the uniform distribution of forces against the rubber, I insert a plug 61 which is rounded to conform to the shape of the inner end wall of the stock, and which has an annular shoulder 62 for receiving the tube 10a.

In making the stock either in the form shown in Fig. 2 or in Fig. 5 the rubber is cured on a mandrel, which is removed before the tube 10a is inserted therein. In addition, the outer surfaces of the tube is subjected to a grinding operation, so that its wall thickness may be uniform throughout its length. Moreover, to facilitate the entrance of the stock into the die and also into the outer tubes, I may apply lubricant in the form of vaseline to the outer surface before the stock engages the die.

The reduction in size of the rubber stock through the die may comprise the only reduction employed, although if desired the stock may be reduced farther upon entering the outer tube. To facilitate the reduction, the opening of the die is tapered, as shown at 65 and the wall of the tube 11a is tapered, as at 66. Due to the fact that the forward end of the advancing unit is unsupported, except by the die, the rubber is free to flow and hence the stretching stresses are distributed uniformly. As a result the finished bushing contains confined rubber, which is under the maximum degree of compression to which it has been subjected during the forming operation, and hence the bushing is capable of withstanding a maximum number of oscillations without evidence of fatigue.

An important advantage of the method disclosed herein is the fact that the bushing may be made in any length and then cut to the desired size, or if desired a large number of short bushings may be made at one time. The method therefore possesses economical manufacturing advantages and assures uniform distribution of stresses in the stretched rubber. The word "freely" as used in the claims means an elastic stock which is not bonded to the core.

I claim:—

1. A method of making a resilient bushing which consists in freely supporting hollow elastic stock on a core, applying force to the leading end only of said stock to force the stock and core through a reducing and stretching die whereby the stock is placed under tension, and forcing the tensioned stock and core into a confining member of less diameter than the diameter of the tensioned stock.

2. A method of making a resilient bushing which consists in freely supporting hollow elastic stock on a core, forcing the stock and core through a reducing and stretching die by applying force only to the leading end thereof to tension the same and to cause the stock to flow from the leading toward the trailing end thereof and equally distribute the stresses throughout the same and then forcing the tensioned stock and core into a confining member of less diameter than the diameter of the tensioned stock.

3. A method of making a resilient bushing which consists in freely supporting hollow, elastic stock on a core, forcing the stock and core into a reducing and stretching confining member having a diameter less than the diameter of the tensioned stock by applying force to the leading end only of the stock.

4. A method of making resilient bushings which consists in freely supporting hollow elastic stock on a core, forcing the stock and core simultaneously into a reducing and stretching confining member having a diameter less than the diameter of the tensioned stock by applying force to the leading end only of the stock, and then cutting transversely the confining member, stock and core in suitable lengths, whereby each length has a core, a confining member and an elastic intermediate member, the elastic member being in uniformly stretched condition throughout its length.

5. A method of making a resilient bushing which consists in freely supporting hollow elastic stock upon a core, forcing the stock and core into a reducing, stretching and confining member having a diameter less than the diameter of the tensioned stock by applying force to the leading end only of the stock, and moving the stock and core at a rate that will stretch the stock uniformly from end to end within the confining member.

OSCAR B. WELKER.